United States Patent
Paden et al.

(10) Patent No.: US 8,159,934 B2
(45) Date of Patent: *Apr. 17, 2012

(54) REPORTING DIAL UP ACCESS PROBLEMS USING A REAL-TIME AUTOMATED SYSTEM

(75) Inventors: Jon Paden, Austin, TX (US); Bobby Sams, Austin, TX (US); Dennis Collins, Hopewell Junction, NY (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/642,302

(22) Filed: Dec. 18, 2009

(65) Prior Publication Data

US 2010/0091649 A1 Apr. 15, 2010

Related U.S. Application Data

(63) Continuation of application No. 10/937,960, filed on Sep. 10, 2004, now Pat. No. 7,660,233.

(51) Int. Cl.
*G01R 31/08* (2006.01)

(52) U.S. Cl. ............... 370/216; 379/22.03; 379/207.15
(58) Field of Classification Search ............. 370/216; 379/22.03, 207.15
See application file for complete search history.

(56) References Cited

U.S. PATENT DOCUMENTS

| | | | | |
|---|---|---|---|---|
| 5,311,594 A * | 5/1994 | Penzias | ........................ | 713/183 |
| 6,785,741 B1 * | 8/2004 | Mandalia et al. | ............. | 719/328 |
| 7,346,152 B2 * | 3/2008 | Paden et al. | ................. | 379/88.16 |
| 7,660,233 B2 * | 2/2010 | Paden et al. | ................. | 370/216 |
| 2004/0037408 A1 * | 2/2004 | Zandt et al. | ............. | 379/207.15 |

* cited by examiner

*Primary Examiner* — Phuc Tran
(74) *Attorney, Agent, or Firm* — Guntin Meles & Gust, PLC; Pablo Meles

(57) ABSTRACT

A server for automatically handling dial-up connectivity problems via a voice connection can include a controller to interface with a caller during a voice call, query a network operations center using a data connection to determine whether a dial-up number associated with the caller and received by the server is out of service, and present alternative dial-up numbers during the voice call without prompting the caller for further information. Other embodiments are disclosed.

17 Claims, 3 Drawing Sheets

200

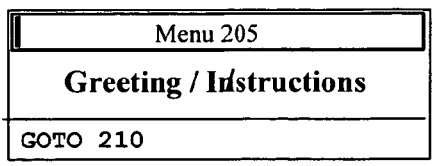

Menu 205
Greeting / Instructions
GOTO 210

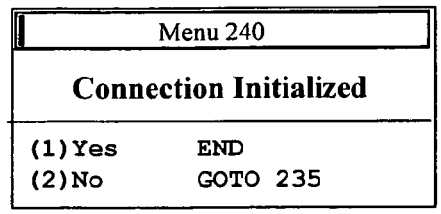

Menu 240
Connection Initialized
(1) Yes        END
(2) No         GOTO 235

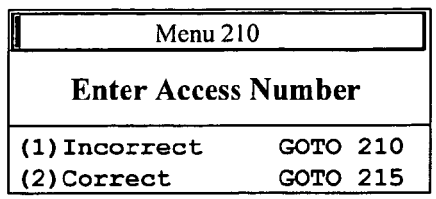

Menu 210
Enter Access Number
(1) Incorrect    GOTO 210
(2) Correct      GOTO 215

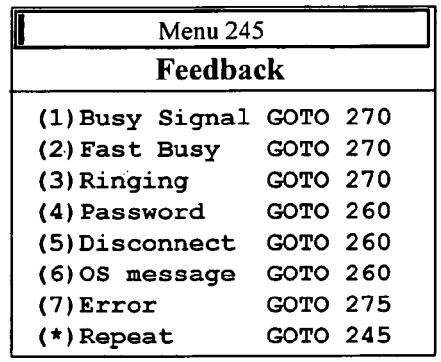

Menu 245
Feedback
(1) Busy Signal  GOTO 270
(2) Fast Busy    GOTO 270
(3) Ringing      GOTO 270
(4) Password     GOTO 260
(5) Disconnect   GOTO 260
(6) OS message   GOTO 260
(7) Error        GOTO 275
(*) Repeat       GOTO 245

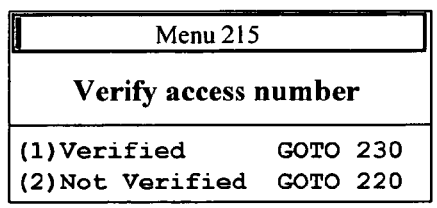

Menu 215
Verify access number
(1) Verified     GOTO 230
(2) Not Verified GOTO 220

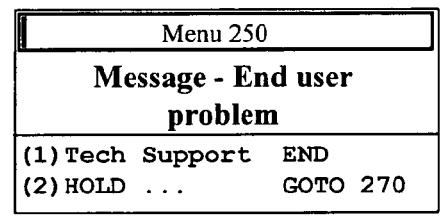

Menu 250
Message - End user problem
(1) Tech Support  END
(2) HOLD ...      GOTO 270

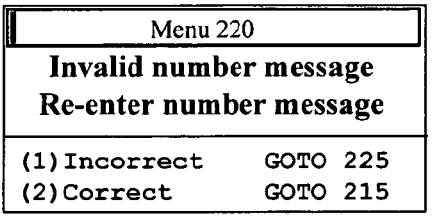

Menu 220
Invalid number message
Re-enter number message
(1) Incorrect    GOTO 225
(2) Correct      GOTO 215

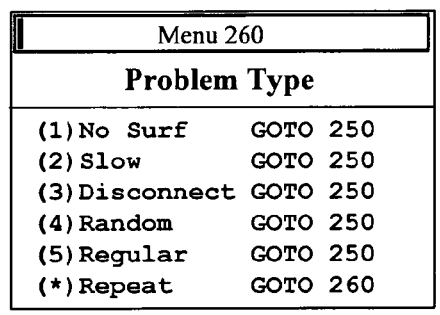

Menu 260
Problem Type
(1) No Surf      GOTO 250
(2) Slow         GOTO 250
(3) Disconnect   GOTO 250
(4) Random       GOTO 250
(5) Regular      GOTO 250
(*) Repeat       GOTO 260

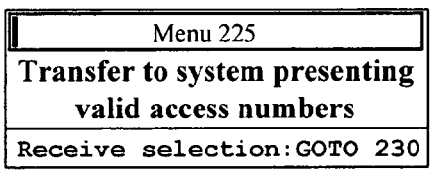

Menu 225
Transfer to system presenting valid access numbers
Receive selection: GOTO 230

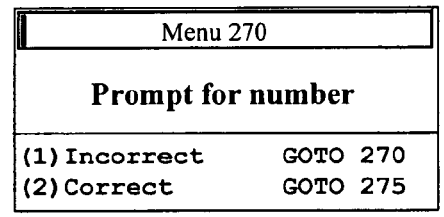

Menu 270
Prompt for number
(1) Incorrect    GOTO 270
(2) Correct      GOTO 275

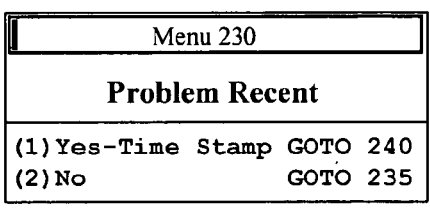

Menu 230
Problem Recent
(1) Yes-Time Stamp  GOTO 240
(2) No              GOTO 235

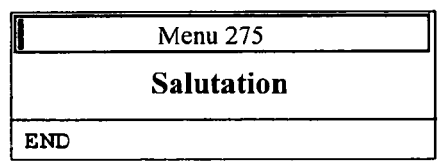

Menu 275
Salutation
END

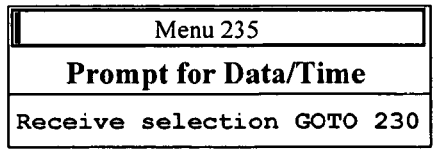

Menu 235
Prompt for Data/Time
Receive selection GOTO 230

REPORTING DIAL UP ACCESS PROBLEMS USING A REAL-TIME AUTOMATED SYSTEM

RELATED APPLICATIONS

This application is a continuation of co-pending U.S. patent application Ser. No. 10/937,960 filed with the U.S. Patent and Trademark Office on Sep. 10, 2004, the disclosure of which is hereby incorporated by reference.

BACKGROUND

1. Field of the Invention

The present invention relates to the field of dial-up networking and, more particularly, to reporting problems with dial-up access numbers.

2. Description of the Related Art

Dial-up Internet users access the Internet by establishing a communication link between their home computer and a computing device of an Internet Service Provider (ISP). The communication link occurs across a phone line and is established when the user contacts the ISP computer device via one or more access telephone numbers. Generally, the user will be able to select one of many access number local to the user so that telephone usage charges are minimized.

It is not uncommon for dial-up users to experience problems when connecting to the Internet via an access number. One typical connectivity problem is an end user problem, meaning that the user is experiencing problems with their home computer, which results in the user being unable to establish a connection with the ISP computing device. Another reason that dial-up users are unable to connect to the Internet is that the access number that the user dialed is temporarily malfunctioning. ISPs often provide a means though which users can report problematic access numbers.

Conventional reporting mechanisms suffer one or more deficiencies, making conventional problem reporting inconvenient to dial-up users and/or expensive for the ISPs. One conventional problem reporting technique involves users contacting live ISP agents in a customer service center over a telephone line to report an access problem. It can be very expensive to staff a customer support center with live agents, so as a cost saving mechanism, such support centers are typically minimally staffed. Consequently, wait times for reporting dial-up connectivity problems can be painfully long for concerned users.

This is especially true since a real problem with a dial-up access number will affect a large user population at approximately the same time. A significant portion of these affected users will attempt to contact the customer support center, thereby overloading the call handling capabilities of the customer support center. Notably, the volume of calls received by the customer support center is unnecessary; as only a small number of calls need to be received before the ISP is apprised of the access number problem.

To combat the problem of live-agents being intermittently overloaded with calls, many ISPs have implemented automated response systems. Many of these automated systems are Web or e-mail based. Such systems can be effectively useless to users attempting to report connectivity problems because such problems are focused around to connect to the Internet. Consequently, a user experiencing a problem can lack access to the Web or e-mail based problem reporting tools.

Another automated reporting mechanism commonly used allows dial-up users to leave voice mail messages that contain problem report details. This reporting mechanism, however, generally provides insufficient guidance to the user concerning details necessary to aid the ISP in troubleshooting a problem. Specifically, voice mail reports leave out critical information such as the problematic access control number, the symptoms the user experienced (that allow the ISP to determine if the problem is an end-user problem or one related to an access number), or the like. Further, dial-up users are often unsatisfied with leaving a voice messages, as such systems provide inadequate feedback. Users reporting problems via a voice message, therefore, often report the same problem to a live customer service representative, when one is available; again resulting in a customer support center being overloaded with calls each time a dial-up access number malfunctions.

BRIEF DESCRIPTION OF THE DRAWINGS

There are shown in the drawings, embodiments that are presently preferred; it being understood, however, that the invention is not limited to the precise arrangements and instrumentalities shown.

FIG. 2 is a menu structure used by an automated system that reports potential dial-up access number problems to a network operations center based upon caller information in accordance with one embodiment of the invention.

DETAILED DESCRIPTION OF THE INVENTION

Figure 1:
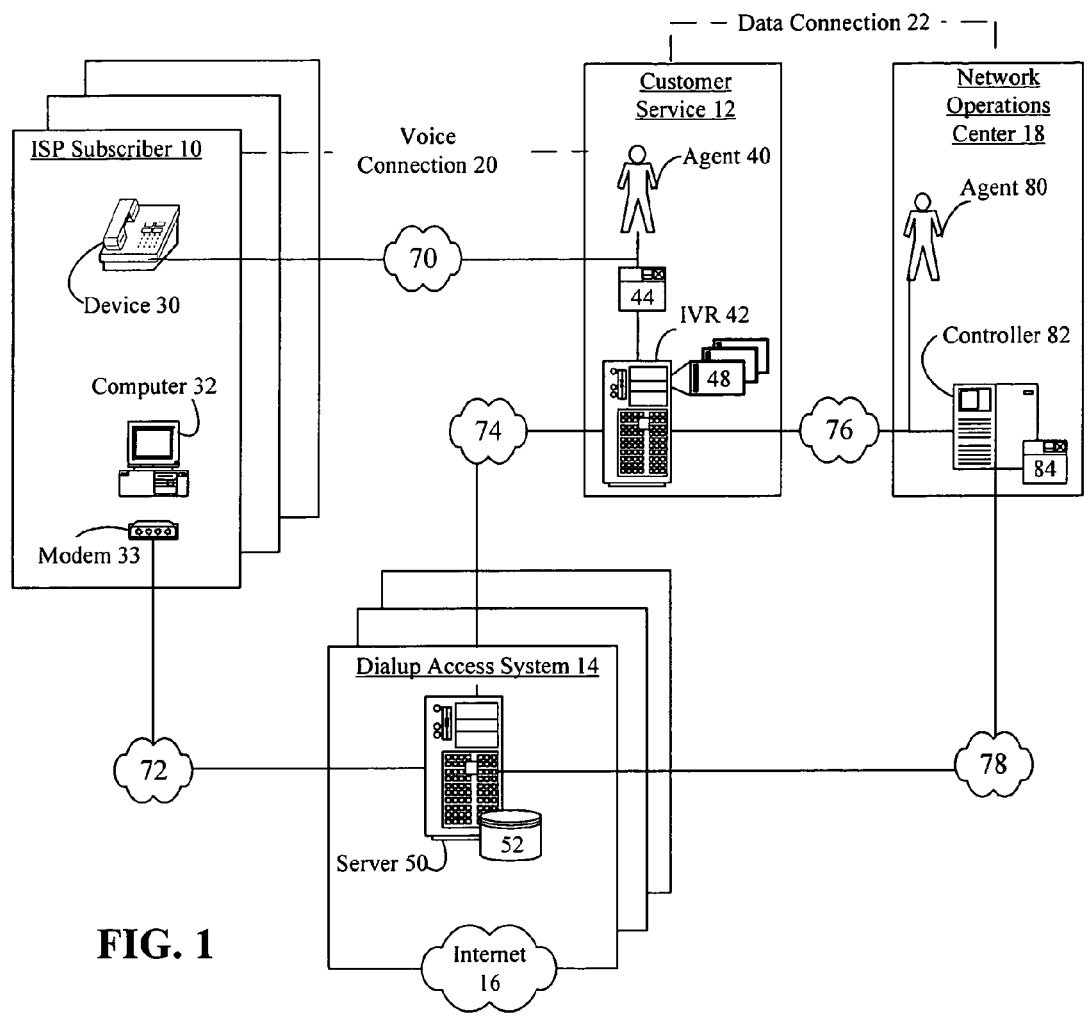
FIG. 1 is a schematic diagram illustrating an automated system for reporting dial-up connectivity problems in accordance with one embodiment of the invention.

The exemplary embodiments describe a system, a method, and an apparatus through which dial-up users can automatically report access problems in a manner useful for an Internet Service Provider (ISP). More specifically, an interactive telephone response system, such as an interactive voice response system (IVR), can handle problem reporting. The automated system can prompt users to enter an access number with which the user is experiencing problems. The received access number can be verified as valid by cross automatically referencing a database of valid access numbers. The user can then be prompted to input connectivity problem details that permit the ISP to target the cause of a problem.

When the input indicates a high likelihood that the user is having an end-user problem, that user can be provided with troubleshooting information and/or transferred to a technical support agent. When the input indicates a high likelihood that there is a problem with an access number, the automated system can determine one or more alternative access numbers local to the user. Then the automated system can present the user with a list of these numbers, thereby allowing the user to connect to the internet via a new dial-up number until the problem with the originally attempted number is resolved. Further, the problem reported to the automated system can be conveyed to a network operations center (NOC) to place a technician on notice of the suspected access number problem. The technician can responsively take a corrective action to restore the problematic access number to service. In one embodiment, the NOC can include automated problem identification and/or problem solving hardware or software that can be initiated upon receipt of the problem report.

In one exemplary embodiment, a method can include receiving a voice call at an automated response server from a caller, querying a network operations center from the server using a data connection to determine whether a dial-up number associated with the caller and received by the server is out of service, presenting an out of service notice during the voice call when the access number is determined to be out of service, and presenting alternative dial-up numbers during the voice call without prompting the caller for further information.

In another exemplary embodiment, a server can automatically handle dial-up connectivity problems via a voice connection, the server can include a controller to interface with a caller during a voice call, querying a network operations center using a data connection to determine whether a dial-up number associated with the caller and received by the server is out of service, and presenting alternative dial-up numbers during the voice call without prompting the caller for further information.

In another exemplary embodiment, a machine-readable storage in an automated response server can have stored thereon, a computer program having a plurality of code sections, said code sections executable by a machine for causing the machine to perform the steps of: interfacing with a caller during a voice connection, prompting the caller for a dial-up access number, determining whether the received dial-up access number is valid, reporting a potential problem associated with the access number to a network operations center via a data connection, receiving a problem response from the network operations center via the data connection, presenting the problem response in real time to the caller over the voice connection, and presenting the caller with at least one alternative dial-up access number via the voice connection.

FIG. 1 is a schematic diagram illustrating an automated system 100 for reporting dial-up connectivity problems in accordance with one embodiment of the invention. The system 100 can include ISP subscribers 10, a customer service center 12, a NOC 18, and a dialup access system 14. The dialup access system 14 can grant Internet 16 access to the ISP subscribers 10. Typically, a computer 32 attached to a modem 33 will communicatively link to a server 50 across network 72. The server 50 will provide network connective using one or more ports, each port being associated with one or more dialup access numbers. Dialup account information contained in data store 52 can be used by the dialup access system 14 to ascertain an access account of the ISP subscriber 10 and to provide account authorization.

The customer service center 12 can receive ISP subscriber 10 calls pertaining to access problems and can help the ISP subscriber 10 re-establish dial-up service. The customer service center 12 can include a customer service agent 40 and an interactive voice response system (IVR) 42 that interfaces with the ISP subscriber through interface 44. The IVR 42 can be directly linked to the server 50 via network 74. Through this link, the IVR 42 can access information contained in the data store 52.

The IVR 42 can be a system that accepts a combination of voice telephone input and/or touch-tone keypad input and provides appropriate feedback in the form of voice, fax, callback, e-mail, as well as other suitable media. In one embodiment, IVR 42 can be a part of a larger application that includes database access, such as a customer service database (not shown) that can be included within the customer service center 12. Notably, the IVR 42 can enter a dialogue with the ISP subscriber 10 in real-time. The dialogue can be controlled using a series of pre-established menus 48.

Additionally, the customer service center 12 can be communicatively linked to the NOC 18 via a data connection 22. More specifically, the IVR 42 can be communicatively linked to the controller 82 via network 76. The NOC 18 can be a center that provides technical support for one or more dial-up access numbers. That is, the NOC 18 provides a support infrastructure that permits the dialup access system 14 to function. The NOC 18 can include one or more live agents 80 and a network controller 82.

The network controller 82 can be one or more communicatively linked computer devices and peripherals that collectively maintain, monitor, and analyze hardware, software, and communication links associated with the dialup access system 14. That is, problem reports generated by the IVR 42 can be conveyed to the network controller 82 in real-time. The network control 82 can responsively initiate a programmatic action in response. For example, the network control 82 can notify an agent 80 of the potential access number problem.

In one embodiment, the NOC 18 can receive problem indications from a multiple sources. These sources can include network monitoring software 84, agents 80, and the user problem reports received via the IVR 42 and/or a customer service agent 40. The monitoring software 84 can monitor the dialup access system 14 across network 78. The NOC 18 can correlate and combine data from each of these sources to determine a likelihood that a problem exists. Different actions can be taken based upon the likelihood score and/or the criticality of reported problems.

As used herein, voice link 20 can be a standard public switched telephone network (PSTN) connection, which is typically a circuit-switched connection. The voice link 20 is not limited in this regard, however, and a packet-based connection that utilizes a technology like Voice over Internet Protocol (VoIP) can also form the voice link 20. The data link 22 can be any communication link capable of digitally conveying information.

Accordingly, networks 70, 72, 74, 76, 78, and 16 can be implemented as any of a variety of fashions so long as content is conveyed using encoded electromagnetic signals. Further, any of a variety of communication devices, such as customer premise equipment (CPE), computers, modems, routers, switches, or the like, can be included within networks 70, 72, 74, 76, 78, and 16.

Each of the networks 70, 72, 74, 76, 78, and 16 can convey content in a packet-based or circuit-based manner. Additionally, each of the networks 70, 72, 74, 76, and 78 can convey content via landlines or wireless data communication methods. For example, each of the networks 70, 72, 74, 76, and 78 can separately include an Intranet, a local area network, a wide area network, or a combination thereof. In another example, each of the networks 70, 72, 74, 76, and 78 can include a telephony network, like a mobile wireless network or a public switched telephone network (PSTN).

It should be appreciated that the arrangements shown in FIG. 1 are for illustrative purposes only and that the invention is not limited in this regard. The functionality attributable to the various components can be combined or separated in different manners than those illustrated herein. For instance, the network operations center 18 can be integrated with the dialup access system 14 in one embodiment.

FIG. 2 is a menu structure 200 used by an automated system that reports potential dial-up access number problems to a network operations center based upon caller information in accordance with one embodiment of the invention. The menu structure 200 can be utilized in the context of any of a variety automated systems. For example, the menu structure 200 can be utilized in the context of system 100 of FIG. 1, where the menus 205-275 can be represented by menus 48 of FIG. 1.

The menu structure 200 can begin with menu 205. Menu 205 can present a greeting and provide instructions to the user concerning the manner in which the user is to select menu options. In one embodiment, the user can be allowed to input responses via voice responses and/or Dual Tone MultiFrequency (DTMF) keypad responses. The menu 205 can also provide system configuration prompts (not shown), that configure the menu structure 200 for a particular caller. For example, system configuration prompts can prompt a user to select a language for the menu prompts of menu structure 200.

Menu 210 can prompt a user to enter an access number that the user believes to be problematic. If no response is provided or if the response does not appear to be in a proper format for an access number, the structure can loop to menu 210. When a phone number capable of being an access number has been entered, the structure can proceed to menu 215.

In menu 215, an access number can be compared against a database of valid access numbers. When the access number matches a number in the database, the structure can jump to menu 230. When the access number does not match a number in the database, the structure can continue to menu 220. Menu 220 can present a message indicating the entered number is invalid and/or no longer in server. A user can then be prompted to re-enter an access number. When a validly formatted number is entered, the structure can loop to menu 215. When a correctly formatted input is not received, the structure can proceed to menu 225.

In menu 225, the user can be transferred to a system that presents a list of valid access numbers from which the user can make a selection. In one embodiment, the list can be limited to only those numbers local to the user, as determined by automatic number identification (ANI) information, by the area code of an incorrectly entered access number, or by any other suitable number limiting criteria.

In menu 230, a user can be prompted as to whether the problem being reported has recently occurred (such as within the last hour). If so, a time stamp of the current time can be automatically recorded and used as a time of problem occurrence. The structure can then proceed to menu 240. If the problem has not recently occurred, the structure can progress to menu 235. In step 235, a user can be prompted for a date and time of the problem.

In menu 240, a user can be prompted for whether the user was able to initialize a connection to determine if an error was subsequent to connectivity establishment. When a user response indicates that the user was unable to connect to the dial-up service, the structure can progress to menu 245. When the user response indicates that the problem occurred subsequent to a connection, the user can be informed that the problem experienced was not a network problem relating to the input access number.

In menu 245, a user can be asked for feedback concerning activities that occurred when the user attempted to connect. Specifically, the user can be asked whether (1) a busy signal was received (2) a fast busy signal was received, (3) if the number rang repeatedly but does not connect, (4) whether the user was repeatedly asked for a password, (5) whether the user was disconnected while the password was being verified, (6) whether they received an operating system error message, such as error 630, 636, 676, 690, etc., (7) whether a connection was initiated and then subsequent errors occurred, and (*) repeat choices. In one embodiment, a busy signal and/or a fast busy signal can be audibly presented when option (1) and (2) above are presented. When options (1), (2), or (3) are selected, the structure can proceed to menu 270. When option (4), (5), or (6) are selected, the structure can proceed to menu 260. When option (7) is selected, the structure can proceed to menu 275 When option (*) is selected, the structure can loop to menu 245.

In menu 250, a message can be presented stating something to the effect of "Please note that the symptom you selected may not always reflect network problems. If you chronically experience this problem, you may wish to be transferred to a technical support representative. Otherwise please hold." If an option for a technical support representative is selected, the user can be transferred to such a representative. Otherwise, after a designated hold time, the structure can proceed to menu 270.

In menu 260, a prompt can what problem a user experiences after being initially connected. Specifically, the user can be asked (1) if the user can connect but cannot surf the web, (2) if the performance is slow, (3) if the user is disconnected within 5 minutes of connecting, (4) if the user is disconnected at random times while actively using the dial-up service, (5) whether the user is disconnected at regular intervals, and (*) repeat choices. The response can be recorded and the structure can loop to menu 250.

In menu 270, the user can be prompted for a telephone number from which the computer dials. When a validly formatted telephone number is entered, the structure can proceed to step 275. When no validly formatted telephone number is entered then the structure can loop to menu 270. In menu 275, a message thanking the user for reporting the problem can be presented. Further, the message of menu 275 can detail the reported problem, indicate whether feedback will be provided to the customer at a later time, or the like. After menu 275, the structure can end (meaning a call with the user can be terminated.)

Figure 3:
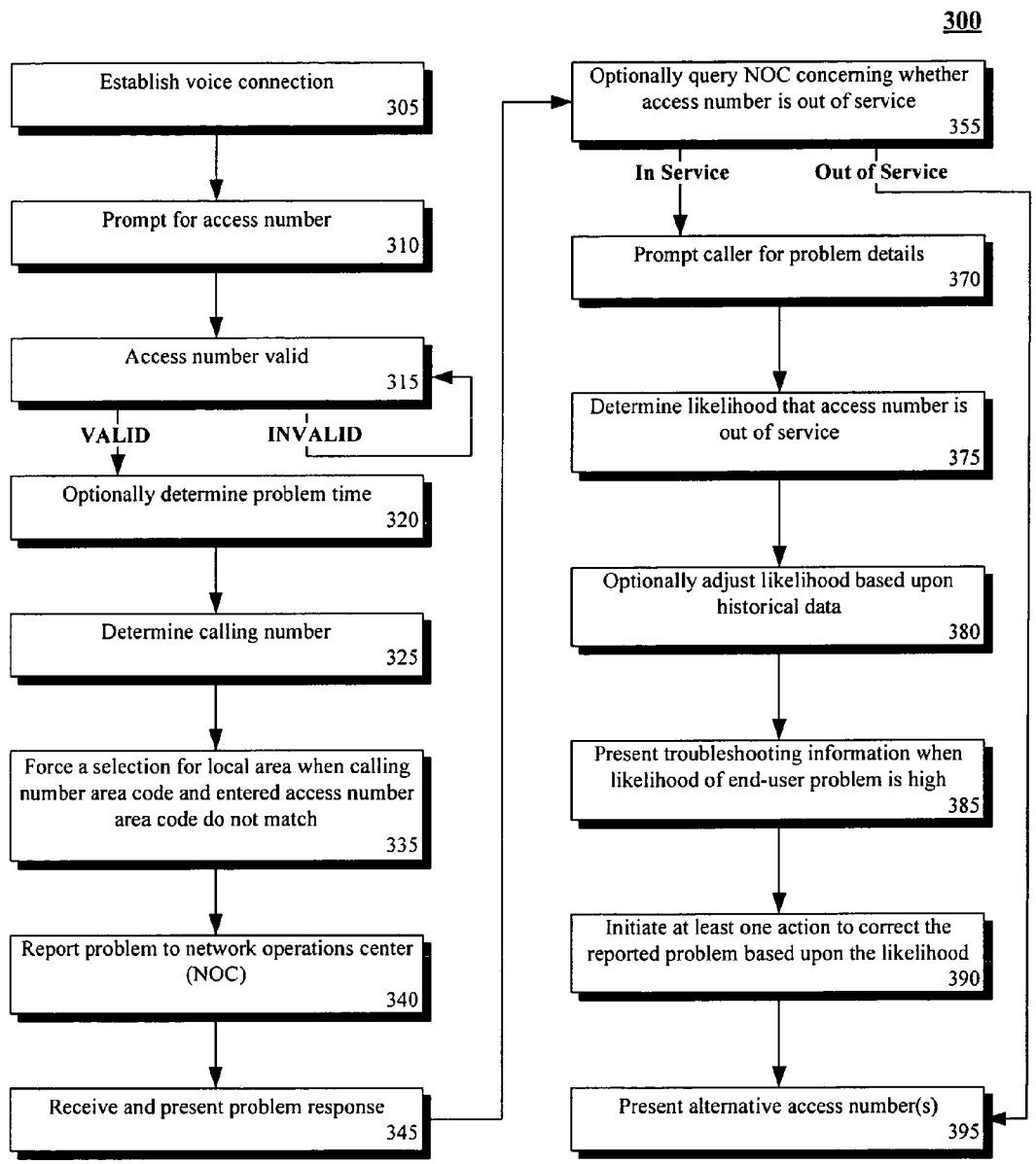
FIG. 3 is a flow chart illustrating a method for reporting and responding to dial-up connectivity problems in accordance with one embodiment of the invention.

FIG. 3 is a flow chart illustrating a method for reporting and responding to dial-up connectivity problems in accordance with one embodiment of the invention. The method 300 can be performed in the context of any of a variety of automated systems having problem reporting capabilities. For example, the method 300 can be performed in the context of system 100 of FIG. 1.

The method 300 can begin in step 305, where a voice connection can be established between a caller and an automated response system. In step 310, the caller can be prompted for a dial-up access number that is problematic for the caller. In step 315, a determination can be made as to whether the received dial-up access number is valid. For example, the input dial-up access number can be compared against a data store of valid dial-up numbers. When the access number is invalid the method can loop to step 310 where the caller can be re-prompted for an access number.

In step 320, a problem occurrence time can be optionally determined. In one embodiment, the caller can be explicitly prompted for a time. In another embodiment, the problem occurrence time can be assumed to be proximate to the reporting time, and a time stamp can be automatically taken, which is used as the problem occurrence time. In one embodiment, when the problem occurrence time indicates that the reported problem has already been resolved, the caller can be so informed and the method can end. Optionally, the user can be asked to re-report the problem should the problem still exist for the user.

In step 325, a calling number can be determined using automatic number identification (ANI) information. In step 335, the area code within the ANI information can be compared against the area code of the problematic access number. When calling number and area code for entered dial-up number do not match, the caller can be prompted to select one or the other for purposes of determining local alternative dial-up numbers.

In step 340, a potential problem can be reported to a network operations center (NOC) responsible for the access number via a data connection. The NOC can responsively take one or more suitable actions. For example, a technician can be dispatched to inspect the reported access number. In step 345, a problem response can be received from the NOC and presented the response to the caller. In step 355, the NOC can be optionally queried to determine whether the received dial-up number is out of service. For example, the NOC can include network monitoring hardware/software that can be automatically activated to confirm the dial-up number status. The NOC can also be communicatively linked to numerous reporting systems other than the one described by method 300 that can be used to confirm the reported problem. When the NOC determines the access number is out of service, the method can proceed directly to step 395.

In step 370, the caller can be prompted for problem details via the voice connection. Responses to the prompts can be reported to the NOC via the data connection. In step 375, a likelihood that the received dial-up access number is out of service can be determined. Appreciably, the likelihood can alternatively indicate that the caller is probably experiencing an end user problem instead of a problem existing with the access number. In step 380, historic data can be optionally searched for other calls by the caller. The likelihood score can be adjusted based upon data retrieved by the search. This step can be used to "reward" callers that have historically provided accurate problem information and to "punish" callers that have historically reported inaccurate information.

In step 385, when the likelihood score indicates that the caller is experiencing an end user problem, the caller can be presented with troubleshooting information relating to at least one end user problem. The presenting of troubleshooting information can includes an option for the caller to speak with a live agent. In step 390, at least one action to correct the potential problem with the reported dial-up access number can be initiated based upon the likelihood. For example, when the likelihood is high that an access number is out of service, a service repair order can be issued. When the likelihood is low, no action may be merited as this time. In step 395, the caller can be presented with at least one alternative dial-up access number via the voice connection. The caller can then be thanked and the method 300 can end.

The steps detailed within method 300 represent one illustrative embodiment of the inventive arrangements disclosed herein. The scope of the invention is to be construed as including adaptive deviations of the method 300 that are essentially the same as steps detailed herein.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method comprising:
   receiving a voice call at an automated response server from a caller;
   querying a network operations center from the server using a data connection to determine whether a dial-up number associated with the caller and received by the server during the voice call is out of service;
   determining a likelihood score that the receive dial-up is out of service based upon reported caller information;
   compare the likelihood score to at least one previously established threshold to determine whether a reported problem is a dial-up access number problem or an end user problem experienced by the caller;
   presenting an out of service notice during the voice call when the dial-up number is determined to be out of service; and
   presenting alternative dial-up numbers during the voice call without prompting the caller for further information.

2. The method of claim 1, comprising:
   receiving a problem response from the network operations center via the data connection; and
   presenting the problem response in real time to the caller over the voice call.

3. The method of claim 1, comprising:
   determining a calling number using automatic number identification information;
   comparing an area code for the calling number with an area code of the received dial-up access number; and
   when area codes are different in the comparing step, prompting the caller to specify whether alternative dial-up access numbers are to be local to the calling number, wherein the presented alternative dial-up access numbers are provided in accordance with a response to the prompting step.

4. The method of claim 1, comprising:
   determining a problem occurrence time by time stamping a time approximate to the time that the voice call was established; and
   reporting the problem occurrence time to the network operations center via the data connection.

5. The method of claim 1, comprising:
   prompting the caller for problem details via the voice call; and
   reporting responses specifying the problem details to the network operations center via the data connection.

6. The method of claim 5, comprising:
   prompting the caller as to whether the caller experienced a no-connect problem or a post-connect problem.

7. The method of claim 5, comprising:
   prompting the caller as to whether the caller received a busy signal or a fast busy signal; and
   presenting an audible sample of at least one of a busy signal and a fast busy signal when prompting for a type of busy signal.

8. The method of claim 1, comprising:
   searching a historic data store for other calls by the caller; and adjusting the likelihood based upon data retrieved by the searching step.

9. The method of claim 1, comprising:
when the likelihood indicates that the caller is experiencing an end user problem, presenting the caller with troubleshooting information relating to at least one end user problem, wherein the presenting of troubleshooting information includes an option for the caller to speak with a live agent.

10. The method of claim 1, comprising:
the network operations center using the likelihood to automatically initiate at least one action to correct a potential problem with the received dial-up access number.

11. A server for automatically handling dial-up connectivity problems via a voice connection, the server comprising:
a memory;
a controller coupled to the memory, wherein the memory comprises computer instructions which when executed by the controller causes the controller to:
interface with a caller during a voice call;
query a network operations center using a data connection to determine whether a dial-up number associated with the caller and received by the server is out of service;
determine a likelihood score that the received dial-up number is out of service based upon reported caller information;
compare the likelihood score to at least one previously established threshold to determine whether a reported problem is a dial up access number problem or an end user problem experienced by the caller; and
present alternative dial-up numbers during the voice call without prompting the caller for further information.

12. The server of claim 11, wherein the controller is adapted to present an out of service notice during the voice call when the access number is determined to be out of service.

13. The server of claim 11, wherein the network operation center receives dial up access problem indications from at least one source other than the server, wherein data received from the at least one source is utilized to confirm problems reported by the server.

14. A non-transitory machine-readable storage in an automated response server, the storage having stored thereon, a computer program having a plurality of code sections, said code sections executable by a machine for causing the machine to perform the steps of:
interfacing with a caller during a voice connection;
prompting the caller for a dial-up access number;
determining whether the received dial-up access number is valid;
reporting a potential problem associated with the access number to a network operations center via a data connection;
receiving a problem response from the network operations center via the data connection;
presenting the problem response in real time to the caller over the voice connection; and
presenting the caller with at least one alternative dial-up access number via the voice connection.

15. The non-transitory machine readable storage of claim 14, wherein the alternative dial-up access number is provided without requiring additional information from the caller.

16. The non-transitory machine readable storage of claim 14, further causing the machine to perform the steps of: automatically determining a likelihood that the received dial-up access number is out of service as opposed to the caller experiencing an end user problem based upon problem details provided by the caller; and performing at least one programmatic action based upon the likelihood.

17. The non-transitory machine readable storage of claim 14, further causing the machine to perform the step of: presenting audible samples of at least one of a busy signal and a fast busy signal as an aid to help callers differentiate between busy signal types during an automated problem reporting process.

* * * * *